United States Patent
Sivakumar et al.

(10) Patent No.: US 12,206,270 B2
(45) Date of Patent: Jan. 21, 2025

(54) METHODS AND SYSTEM FOR INTEGRATED SENSING AND SELF-CHARGING IN AGRICULTURAL IMPLEMENTS

(71) Applicant: MAHINDRA & MAHINDRA LIMITED, Tamil Nadu (IN)

(72) Inventors: A Sivakumar, Chengalpattu (IN); Kuchimanchi Rajeswar, Chengalpattu (IN); Venugopal Shankar, Chengalpattu (IN); Aravind Bharadwaj, Chengalpattu (IN); N Saravanan, Chengalpattu (IN); Pavithra Sundaram, Chengalpattu (IN)

(73) Assignee: MAHINDRA & MAHINDRA LIMITED, Chengalpattu (IN)

( * ) Notice: Subject to any disclaimer, the term of this patent is extended or adjusted under 35 U.S.C. 154(b) by 728 days.

(21) Appl. No.: 17/436,430

(22) PCT Filed: Mar. 5, 2020

(86) PCT No.: PCT/IN2020/050203
§ 371 (c)(1),
(2) Date: Sep. 3, 2021

(87) PCT Pub. No.: WO2020/178858
PCT Pub. Date: Sep. 10, 2020

(65) Prior Publication Data
US 2022/0166237 A1    May 26, 2022

(30) Foreign Application Priority Data

Mar. 6, 2019   (IN) .............................. 201941008765

(51) Int. Cl.
*H02J 7/00* (2006.01)
*A01B 76/00* (2006.01)
(Continued)

(52) U.S. Cl.
CPC ............ *H02J 7/0047* (2013.01); *A01B 76/00* (2013.01); *B60R 16/033* (2013.01);
(Continued)

(58) Field of Classification Search
CPC ................... H02J 7/0047; A01B 76/00; G05B 2219/45017; B60R 16/033
See application file for complete search history.

(56) References Cited

U.S. PATENT DOCUMENTS

2020/0101978 A1* 4/2020 Kim ......................... G01P 3/00
2020/0277923 A1* 9/2020 Dixon ................. F02N 11/0803

* cited by examiner

Primary Examiner — David V Henze-Gongola
(74) Attorney, Agent, or Firm — Maschoff Brennan (57) ABSTRACT

Methods and systems for integrated sensing and self-charging in agricultural implements. Embodiments disclosed herein relate to agricultural vehicles, and more particularly to methods and systems for an integrated sensing and self-charging in agricultural implements. A control system disclosed herein for an agricultural implement includes a battery management unit configured to generate power upon sensing speed/rotation of the agricultural implement. The battery management unit is a self-rechargeable unit. The battery management unit is further configured to provide the generated power to the control unit for controlling at least one operation of the agricultural implement. The battery management unit includes at least one of at least one sensor, a secondary battery, a charger circuitry, and a secondary sensor unit.

17 Claims, 12 Drawing Sheets

(51) Int. Cl.
*B60R 16/033* (2006.01)
*G05B 19/042* (2006.01)
*G07C 5/00* (2006.01)

(52) U.S. Cl.
CPC ........... *G05B 19/042* (2013.01); *G07C 5/006* (2013.01); *G05B 2219/45017* (2013.01)

METHODS AND SYSTEM FOR INTEGRATED SENSING AND SELF-CHARGING IN AGRICULTURAL IMPLEMENTS

CROSS REFERENCE TO RELATED APPLICATION

This application is based on and derives the benefit of Indian Application 201941008765 filed on 6 Mar. 2019, the contents of which are incorporated herein by reference.

TECHNICAL FIELD

Embodiments disclosed herein relate to agricultural vehicles, and more particularly to methods and systems for integrated sensing and self-charging in agricultural implement(s) connected to an agricultural vehicle.

BACKGROUND

Agricultural implements (such as rotavators, sprayers, harrows, plows, planters, harvesters/reapers and so on) can be connected to an agricultural vehicle for performing agricultural related operations. The agricultural implement may include a control system for measuring parameters of the agricultural implement (such as speed, hours of usage, and so on) and providing warnings/alerts to an operator to operate the agricultural implement at an optimized speed based on the measured parameters.

Figure 1:
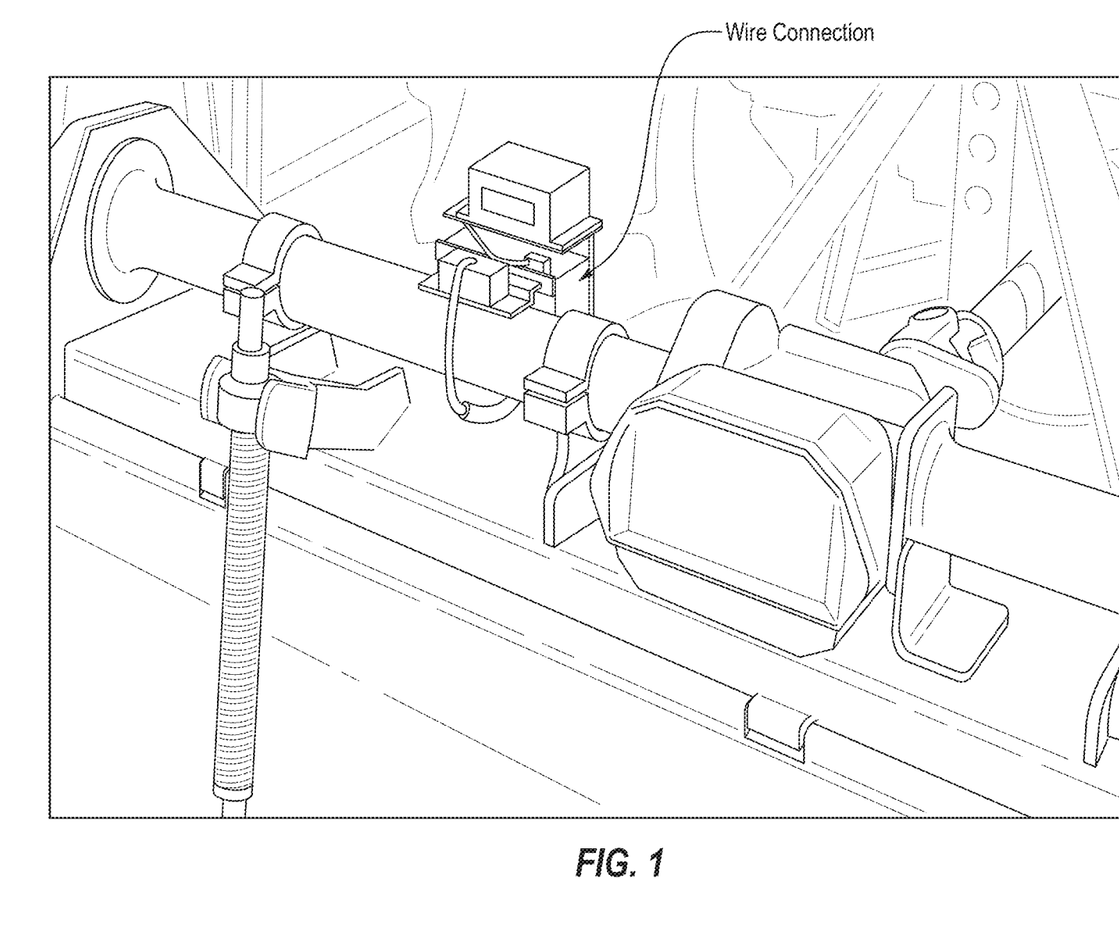
FIG. 1 depicts a wire connection used to connect a battery of an agricultural implement with a power source of an agricultural vehicle.

In conventional approaches, the agricultural implement may be coupled to a battery that provides power supply to components of the control system to measure the various parameters of the agricultural implement. The battery derives the power supply from a power source present in the agricultural vehicle (for example, an ignited engine, a battery of the agricultural vehicle, an on-board battery, or the like). In order to derive the power supply from the agricultural vehicle, the battery coupled with the agricultural implement may be connected to the power source of the agricultural vehicle using a wire connection. In an example herein, the agricultural implement such as a rotavator connected to a tractor and the wire connection used to connect the battery coupled to the rotavator with the power source of the tractor is depicted in FIG. 1. However, such a wire connection may be damaged while performing agricultural related operations due to various factors. For example, the wire connection may be damaged due to high running speed of a Power Take Off (PTO) shaft mounted on the agricultural vehicle (a device used to transfer the power supply from the agricultural vehicle to the agricultural implement). The wire connection may also be damaged due to stones during tillage process. The damage of the wire connection may lead to a failure in the control system.

In addition, due to the wire connection, terminal connections with the battery have to be disconnected, while disconnecting the agricultural implement from the agricultural vehicle, which further leads to requirement for water and dust protections for the battery.

OBJECTS

The principal object of embodiments herein is to disclose methods and systems for integrated sensing and self-charging in agricultural implement(s) connected to an agricultural vehicle.

Another object of embodiments herein is to disclose methods and systems for implementing a self-chargeable battery management unit in a control system of the at least one agricultural implement.

Another object of embodiments herein is to disclose methods and systems for enabling the battery management unit to generate power on sensing speed of the at least one agricultural implement, and providing the generated power to a control unit for controlling operations of the at least one agricultural implement.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, through out which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and system for integrated sensing and self-charging in agricultural implements.

Referring now to the drawings, and more particularly to FIGS. 2a through 9, where similar reference characters denote corresponding features consistently throughout the figures, there are shown embodiments.

FIGS. 2a-2e depict a control system 201 of agricultural implement(s) 200 attached to an agricultural vehicle, according to embodiments as disclosed herein. The agricultural vehicle herein refers to any vehicle/farm machinery that can be used for performing at least one agricultural related operation. An example of the agricultural vehicle can be, but not limited to, a tractor, a thresher, a harvester, a combiner, and so on. Embodiments herein are further explained considering the tractor as an example of the agricultural vehicle, but it may be obvious to a person of ordinary skill in the art that any suitable vehicle can be considered.

The agricultural vehicle can be capable of pulling, operating, and transporting one or more agricultural implements 200 connected thereto. Examples of the agricultural implement 200 can be, but not limited to, rotavators, sprayers, harrows, plows, planters, harvesters/reapers, fertilizer spreader, sprayers, dispersers, and so on. In an embodiment, the agricultural implement 200 can be connected to the agricultural vehicle using a detachable means, such as a three-point hitch/linkage, and so on. In an embodiment, the agricultural implement 200 can be connected to the agricultural vehicle permanently.

Figure 2A:
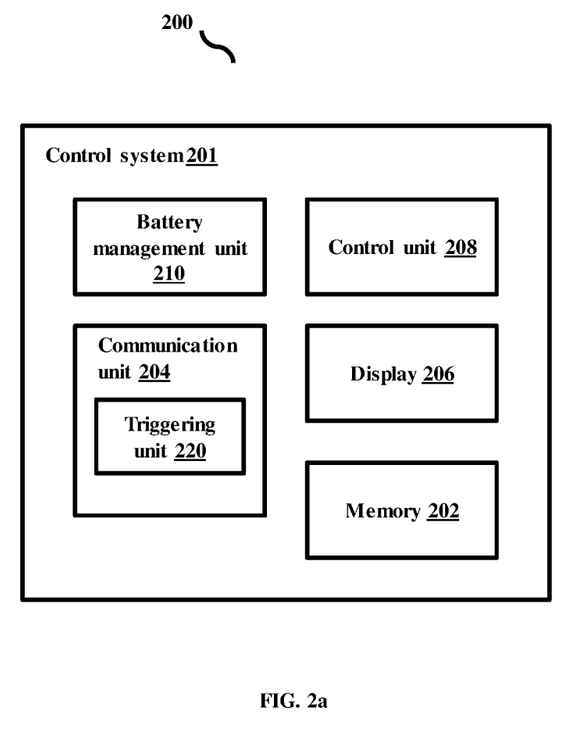
FIGS. 2a-2e depict a control system of agricultural implement(s) attached to an agricultural vehicle, according to embodiments as disclosed herein.

The agricultural implement includes the control system 201, which can be mounted on the agricultural implement 200 at a suitable position. The control system 201 can be configured to manage operations of the agricultural implement 200. In an embodiment, the control system 201 can be configured to self-recharge the agricultural implement(s) 200 connected to the agricultural vehicle. As illustrated in FIG. 2a, the control system 201 includes a memory 202, a communication unit 204, a display 206, a control unit 208, a battery management unit 210, and a triggering unit 220. The components of the control system 201 can communicate with each other using at least one of the Internet, a wired network (a Local Area Network (LAN), a Controller Area Network (CAN) network, a Universal Asynchronous Receiver/Transmitter (UART), a bus network, Ethernet and so on), a wireless network (a Wi-Fi network, a cellular network, a Wi-Fi Hotspot, Bluetooth, Zigbee and so on) and so on.

The memory 202 can store at least one of, but not limited to, measured parameters (for example: speed, rotations, or the like) of the agricultural implement 200, and so on. The memory may include one or more computer-readable storage media. The memory 202 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered a non-transitory storage medium. The term "non-transitory" may indicate that the storage medium is not embodied in a carrier wave or a propagated signal. However, the term "non-transitory" should not be interpreted to mean that the memory 202 is non-movable. In certain examples, a non-transitory storage medium may store data that can, over time, change (e.g., in Random Access Memory (RAM) or cache).

The communication unit 204 can be configured to enable the control system 201 to connect to at least one external entity (such as an external server, a user/operator device (device used by an operator of the agricultural implement), and so on. In an embodiment, the communication unit 204 can enable the control system 201 to connect with the at least one external entity using at least one of a Wireless Local Area Network (WLAN), Wireless Fidelity (Wi-Fi), Wi-Fi Direct, Bluetooth, Bluetooth Low Energy (BLE), cellular communications (2G/3G/4G/5G or the like), and so on. In an embodiment, the communication unit 204 may include physical ports that enable the control system 201 to connect with additional devices/modules. Examples of the physical ports can be, but not limited to, general-purpose input/output (GPIO), Universal Serial Bus (USB), Ethernet, Display Serial Interface (DSI), and so on. Examples of the additional devices/modules can be, but not limited to, a CAN bus, On-board diagnostics (OBD) ports, the sensor unit, and so on.

The display unit 206 can be configured to enable the operator of the agricultural implement 200 to interact with the control system 201. The display unit 206 can also display various parameters (such as speed, load, and so on) of the agricultural implement 200 to the operator. The display unit 206 can also display alerts/warnings generated by the control unit 208 to the operator to operate the agricultural implement 200 in an optimized speed. The alerts/warnings can be in the form of at least one of a visual alert/warning (provided using the display or any other suitable means such as a light) or an audio alert/warning (provided using a speaker, headphones, earphones, and so on). The alerts/warnings can be also provided to another device (which may be present remotely), such as a mobile phone, smart phone, computer, server, and so on.

The control unit 208 can include at least one of a single processer, a plurality of processors, multiple homogeneous or heterogeneous cores, multiple CPUs of different kinds, a microcontroller, and other accelerators. Further, the plurality of processing units may be located on a single chip or over multiple chips. The control unit 208 also includes components such as, but not limited to, Input/Output (I/O) ports, a memory, a storage unit, and so on. The control unit 208 can be configured to control at least one operation of the agricultural implement 200. The control unit 208 can be configured to measure the various parameters of the agricultural implement 200 using various sensors and accordingly provides the warning/alerts to the operator to operate the agricultural implement 200 in the optimized speed. The control unit 208 can also be configured to control functions of the other components of the control system 201.

In an embodiment, the control unit 208 can also be configured to provide an alert to the operator for changing oil of the agricultural implement 200. The control unit 208 can provide the alert by monitoring for oil check alerts at regular periodic intervals of time. Whenever, the agricultural implement 200 clocked in for cumulative hour reading for certain hours, the control unit 208 identifies "x" alert initiated for checking oil. Whenever, it crosses another set of "y" hours, the control unit 208 initiates the alert for the operator to change the oil. Thus, the operator/user need not to check manually, which further enables proper service life and warranty of the agricultural implement 200. The "x", and "y" hours may vary based on manufacturer recommendations. In an example, the control unit 208 may monitor for the oil check alerts at every 50 hours or 500 hours, but it should be obvious to a person skilled in the art that any other reading of hours can be considered.

The battery management unit 210 can be configured to power up the components 202-208 of the control system 201 by providing power to the components 202-208.

Figure 2B:
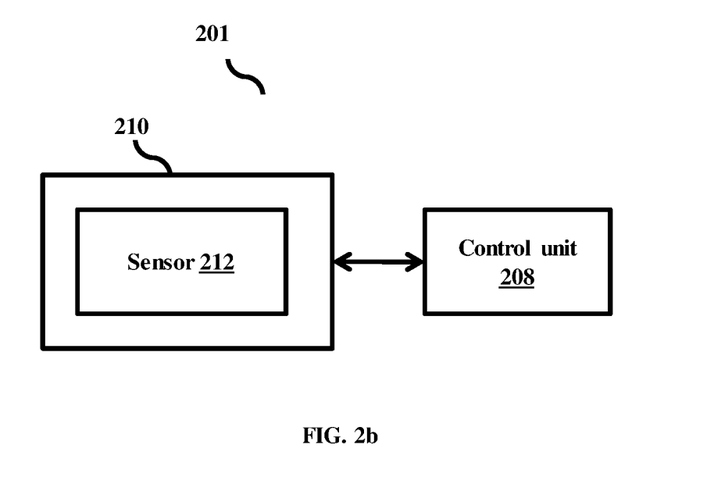

In an embodiment, as depicted in FIG. 2b, the battery management unit 210 includes at least one sensor 212. In an embodiment, the at least one sensor 212 can be configured to provide the power/voltage to the components 202-208 of the control system 201. Thus, the sensor 212 of the battery management unit 210 acts as a primary battery for agricultural implement 200 by eliminating a requirement for an internal battery in the agricultural implement 200. The sensor 212 includes a magneto system (as depicted in FIG. 3b), which can be configured to generate voltage by sensing rotation of the agricultural implement 200. The generated voltage can be provided as the power to the control unit 208. The generated voltage can be provided as the power to the other components of the control system 201. The sensor 212 can also be configured to measure parameters of the agricultural implement 200 such as, but not limited to, load, hours of usage, speed, time of operation, and so on.

Figure 2C:
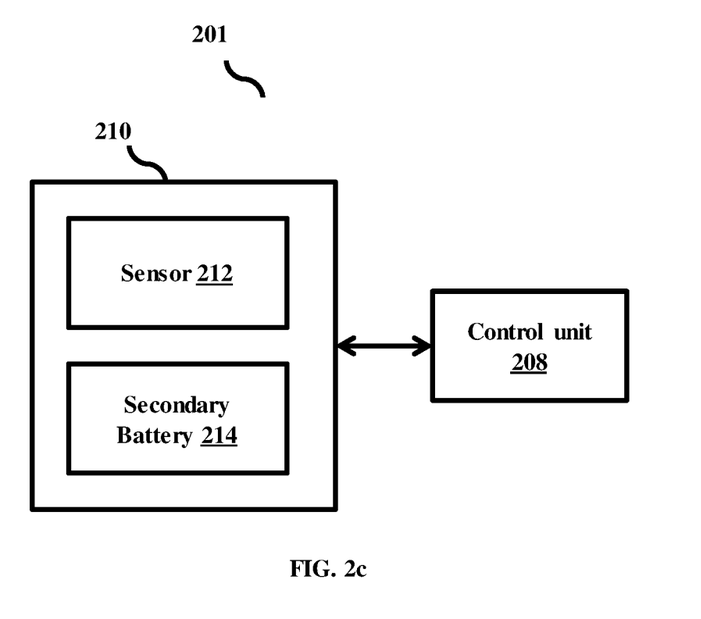

In an embodiment as depicted in FIG. 2c, the battery management unit 210 includes the at least one sensor 212, and a secondary battery 214 for generating the power/voltage. The generated power/voltage can be used for power up/operating the components of the agricultural implement 200. In an embodiment, the secondary battery 214 can be a non-rechargeable battery or a rechargeable battery. The secondary battery 214 increases reliability of the agricultural implement by avoiding the fluctuations in the control system 201, when the agricultural implement 200 operates even at lower rotations per minute (RPM).

Figure 2D:
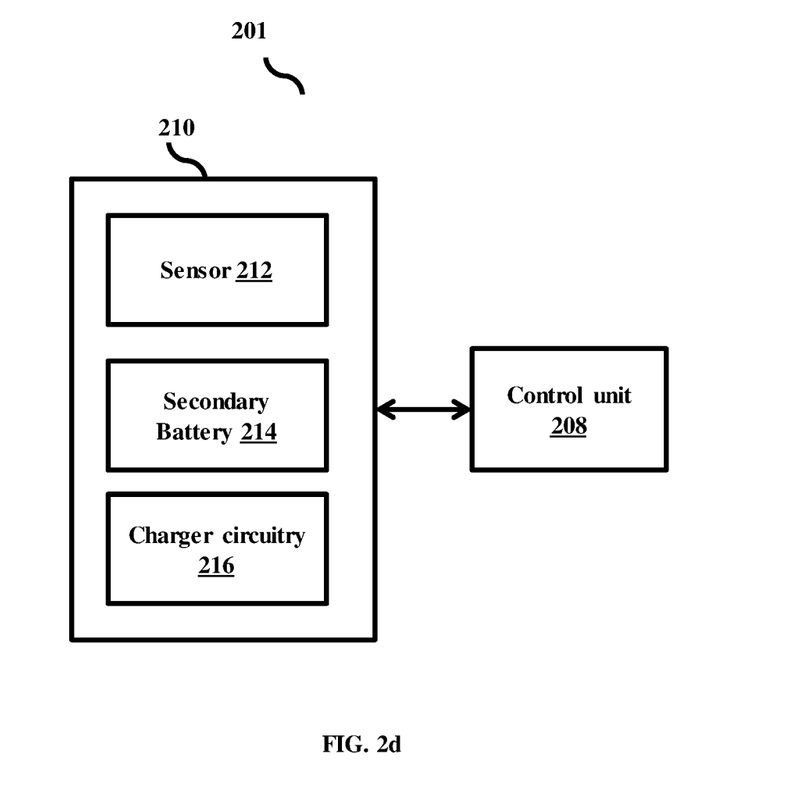

In an embodiment, as depicted in FIG. 2d, the battery management unit 210 includes the at least one sensor 212, the secondary battery 214, and a charger circuitry 216 for generating the power/voltage. The generated power/voltage can be used for power up/operating the components of the agricultural implement 200. The charger circuitry 216 can be configured to charge the secondary battery 214. The charger circuitry 216 can be connected with an external adapter/charger to recharge the at least one battery 214. Thereby, eliminating a need of battery replacement.

Figure 2E:
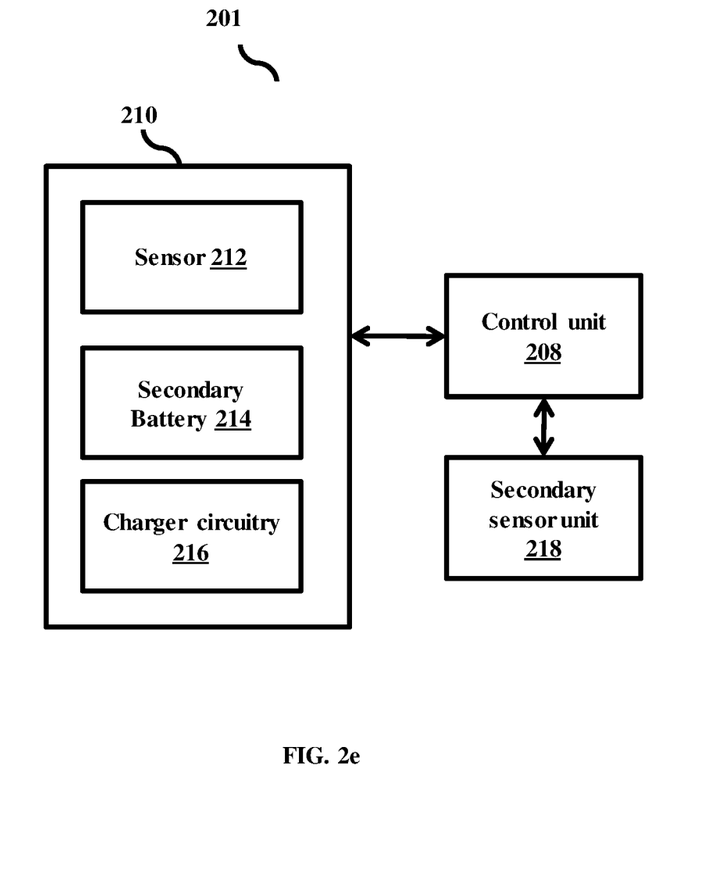

In an embodiment, as depicted in FIG. 2e, the control system 201 includes a separate secondary sensor unit 218 coupled with the control unit 208, and the battery management unit 210. The battery management unit 210 includes the sensor 212, the secondary battery 214, and the charger circuitry 216 for generating the power/voltage. The secondary sensor unit 218 can be configured to measure parameters of the agricultural implement 200 such as, but not limited to, load, hours of usage, speed, time of operation, and so on.

The triggering unit 220 can be positioned in the communication unit/transmitter unit 204 of the control system 201. The triggering unit 220 can be configured to provide the charge/voltage/power to the sensor 212 of the battery management unit 210 for operating/functioning.

Figure 3A:
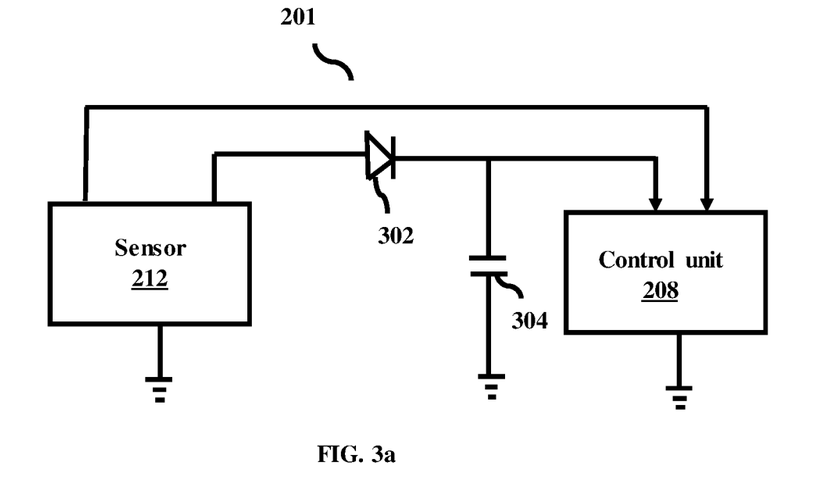
FIG. 3a depicts the control system of the agricultural implement including the sensor for generating the power, according to embodiments as disclosed herein.
Figure 3B:
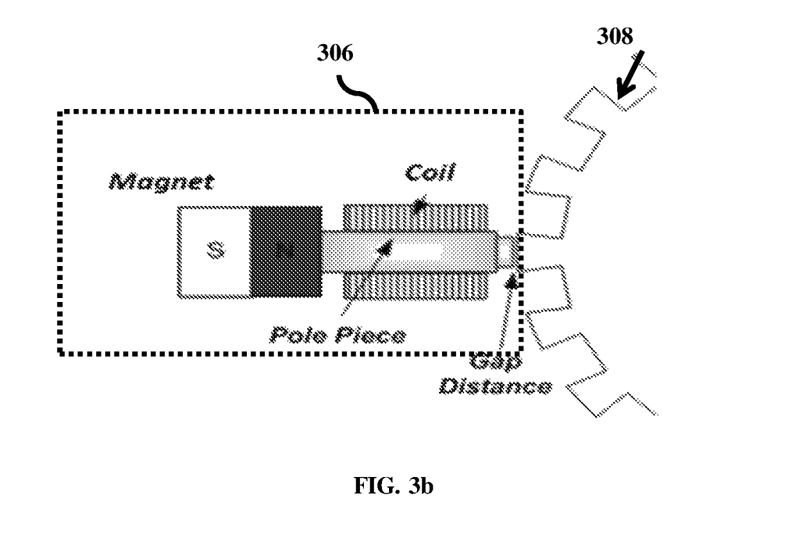
FIG. 3b depicts the sensor for generating the power, according to embodiments as disclosed herein.

FIG. 3a depicts the control system 201 of the agricultural implement 200 including the sensor 212 for generating the power, according to embodiments as disclosed herein. As depicted in FIG. 3a, the control system 201 includes the sensor 212 of the battery management unit, and the control unit 208. In an embodiment, the sensor 212 can be, but not limited to, a magnetic type speed sensor, a proximity type speed sensor, a contact-type sensor, a non-contact type sensor and so on. In an embodiment, the speed sensor 212 can be a Hall Effect sensor. However, it is also within the scope of the embodiments disclosed herein to provide any type of speed sensor without otherwise deterring the intended function of measuring speed values as can be deduced from this description and corresponding drawings.

The sensor 212 can be connected to the control unit 208 using a combination of a diode 302, and a capacitor 304. The sensor 212 can be configured to sense/measure rotation/speed of the agricultural implement, and generate the voltage/power based on the measured speed. The sensor 212 can also be configured to measure the parameters such as, but not limited to, speed, load, hours of usage, time of operation, and so on of the agricultural implement 200. The sensor 212 can provide the generated power/voltage to the control unit 208 on sensing the rotation of the agricultural implement (i.e. when the agricultural implement starts to operate). The control unit 208 can be configured to control the supply of the power/voltage to the other components 202-206 of the control system 201, thereby eliminating the requirement of the internal battery for the agricultural implement 200. The control unit 208 can also be configured to regulate amplitude of the generated voltage. The amplitude of the generated voltage may vary based on the speed of rotation of the agricultural implement 200. A peak value of the amplitude of the voltage may cause variations in the circuit voltage during the generation of the power. In order to eliminate such kind of variations, the control unit 208 measures a rate of change of the amplitude of the generated voltage to determine a trigger of a speed counter as 1, 2, 3, and so on for example. The control unit 208 further smoothens the peak value of the amplitude of the generated using a capacitor circuit and feeds the smoothened voltage into the battery management unit 210 for charging such that the uniform voltage may provided for charging the battery management unit 210. In an embodiment, the sensor 212 may generate the power supply by achieving critical parameters. Examples of the critical parameters can be, but not limited to, air gap optimization, increased number of triggers for self-charging, which further increases voltage generation, and accuracy of measuring the speed, generation of the power supply/voltage without requiring the internal battery, and so on.

Embodiments herein are further explained the generation of the power by considering the sensor 212 as the Hall Effect wheel sensor for example, but it may be obvious to a person skilled in the art that any other speed sensors may be used for generating the power. As depicted in FIG. 3b, the sensor 212/Hall Effect wheel speed sensor 212 includes a magneto system 306 for generating the power. The magneto system 306 may be placed in proximity of at least one rotor/shaft 308 of the agricultural implement. It should be noted that configurations of the components of the magneto system 306 of the sensor 212 may vary based on the manufacturer, and the quantity of the power generation.

The rotor/shaft 308 of the agricultural implement starts rotating, once the agricultural implement 200 starts operating. The magneto system 306 of the sensor 212 can interact with the rotating rotor/shaft and changes the magnetic field.

The change in the magnetic field changes inductance/voltage created on the magnetic field. The inductance/voltage created on the magnetic field may be provided as the power supply/voltage to the control unit 208 without any power storage.

In an embodiment, the magneto system 306 enables the power/voltage generation from an inductance that may be created on the magnetic. It should be noted that any kind of sensors for example, but is not limited to, a magnetic to inductance sensor, a non contact to contact type sensor (for example: used for light circuit), and so on can be used for generating the voltage/power.

Figure 4:
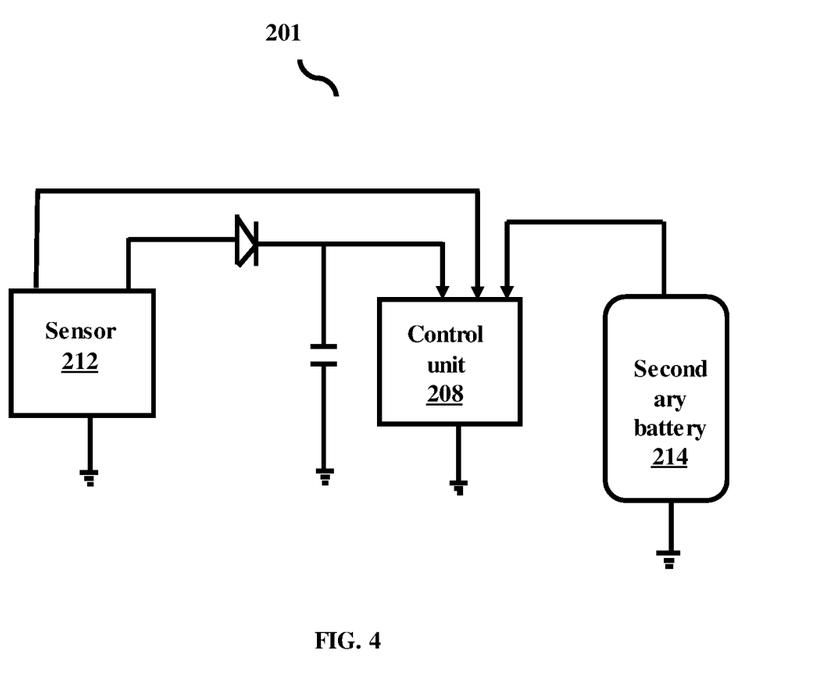
FIG. 4 depicts the control system of the agricultural implement including the sensor and the secondary battery for generating the power, according to embodiments as disclosed herein.

FIG. 4 depicts the control system 201 of the agricultural implement 200 including the sensor 212 and the secondary battery 214 for generating the power, according to embodiments as disclosed herein. As depicted in FIG. 4, the control system 201 includes the sensor 212, the secondary battery 214, and the control unit 208. The sensor 212 and the secondary battery 214 can be connected to the control unit 208. The secondary battery 214 can be the rechargeable battery (for example: a lithium ion battery (having 3.7V 2.5 AH)). The sensor 212 can be configured to generate the power/voltage on sensing the rotation of the agricultural implement 200. The power/voltage generated by the sensor 212 can be connected to the control unit 208 as the primary power supply. If there is a requirement for the additional power supply, then the secondary battery 214 can be configured to provide the power to the control unit 208. The secondary battery 214 increases the reliability of the control system 201 by providing the additional power supply internally. The secondary battery 214 also avoids power fluctuations in the control system 201, when the agricultural implement 200 operates even at lower RPMs. Further, the sensor 212, and the control unit 208 can be optimized to increase the reliability of the control system 201.

Figure 5A:
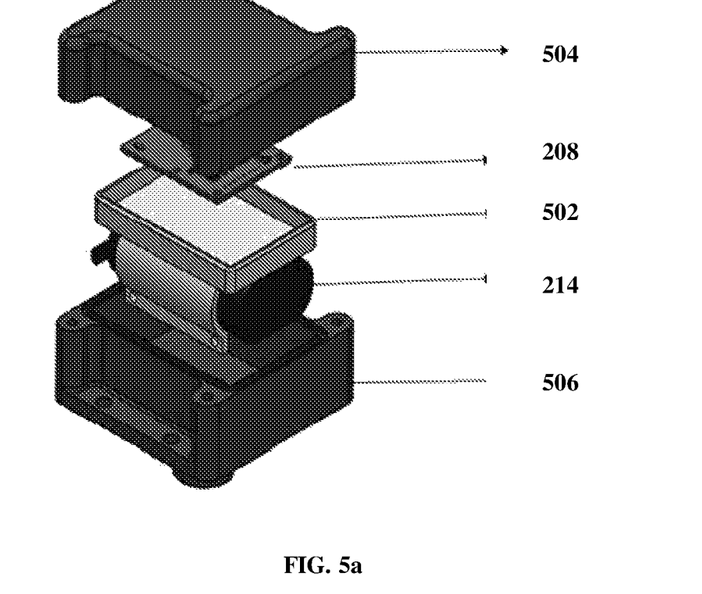
FIGS. 5a and 5b depict package/design implementation of the battery management unit including the sensor, and the secondary battery in the control system of the agricultural implement, according to embodiments as disclosed herein.
Figure 5B:
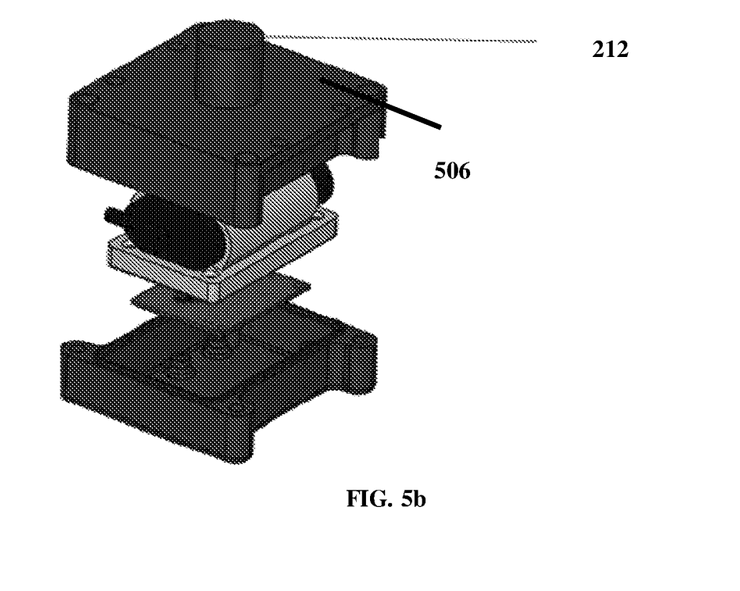

FIGS. 5a and 5b depict package/design implementation of the battery management unit 210 including the sensor 212, and the secondary battery 214 in the control system 201 of the agricultural implement 200, according to embodiments as disclosed herein. As depicted in FIGS. 5a, and 5b, the control system 201 includes a partition cover/unit 502, a top cover 504, a bottom cover 506, the sensor 212, and the secondary battery 214.

The partition unit/cover 502 may be designed to hold the control unit 208 and the secondary battery 214 together. The partition unit/cover 502 may be connected to the top cover 504. The top cover 504 may have provision for holding the control unit 208. The bottom cover 506 may be designed to hold the sensor 212 (as depicted in FIG. 5b).

During a servicing/replacement of the secondary battery 214, the top cover 504 can be removed, and the secondary battery 214 can be replaced without disturbing the control unit 208. Such an arrangement provides ease of serviceability and anti-tamper of hardware.

Figure 6:
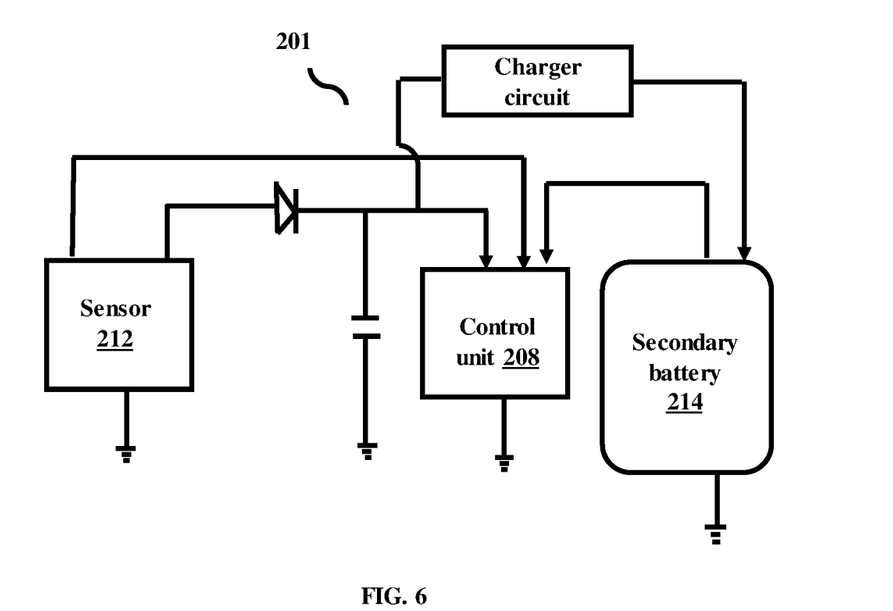
FIG. 6 depicts the control system of the agricultural implement including the sensor, the secondary battery, and the charging circuitry for generating the power, according to embodiments as disclosed herein.

FIG. 6 depicts the control system 201 of the agricultural implement 200 including the sensor 212, the secondary battery 214, and the charger circuitry 216 for generating the power, according to embodiments as disclosed herein. As depicted in FIG. 6, the control system 201 includes the sensor 212, the secondary battery 214, the charger circuitry 216, and the control unit 208. The sensor 212, the secondary battery 214, and the charger circuitry 216 can be connected to the control unit 208. In an example, the secondary battery 214 can be a rechargeable battery. The sensor 212 can be configured to generate the power/voltage on sensing the rotation of the agricultural implement 200 (as depicted in FIG. 3b). The power supply/voltage generated by the sensor 212 can be provided to the control unit 208 as the primary power supply. If there is a requirement for the additional power supply or when the agricultural implement 200 operates at the lower RPM, the secondary battery 214 can be configured to provide the power to the control unit 208, as additional power supply. The charger circuitry 216 can be in-built charger, which can be connected to the external adapter to recharge the secondary battery 214. In an embodiment, the charger circuitry 216 includes an option to charge from the external power supply (for example, but is not limited to, a Type B/Type C/mini Universal Serial Bus (USB), a two pin charging system and so on). Therefore, there is no need of battery replacement, so that the operator can use the agricultural implement 200 for longer durations with longer battery life. In an embodiment, the control unit 208 can be configured to monitor a maximum number of charging and discharging cycles of the secondary battery 214. The control unit 208 further informs the monitored maximum number of charging and discharging cycles of the secondary battery 214 to the operator.

Figure 7A:
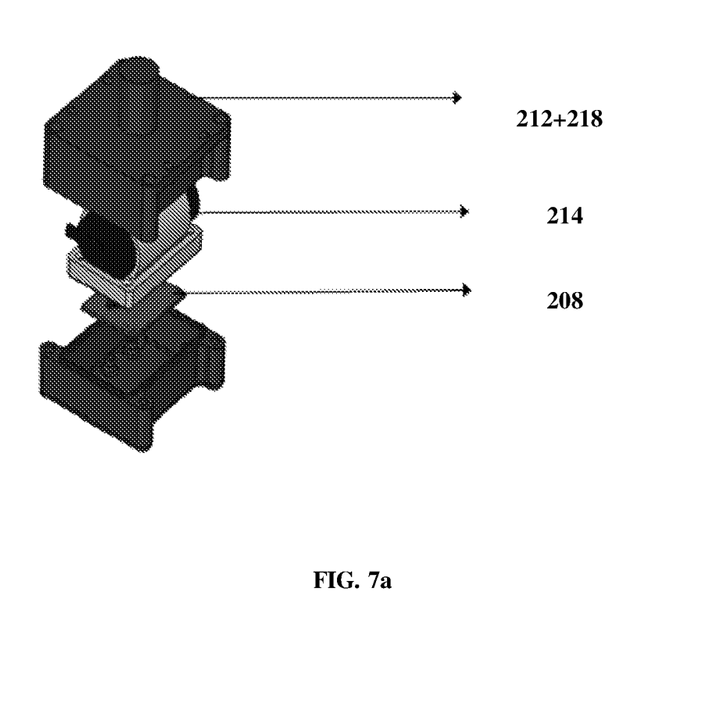
FIGS. 7a-7c depict different packing/design implementation of the battery management unit including the sensor, the secondary battery, and the charger circuitry in the control system of the agricultural implement, according to embodiments as disclosed herein.
Figure 7B:
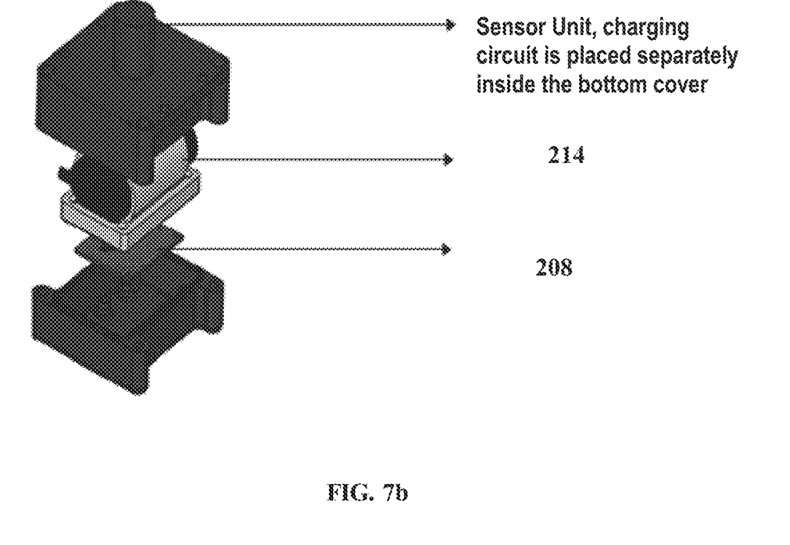
Figure 7C:
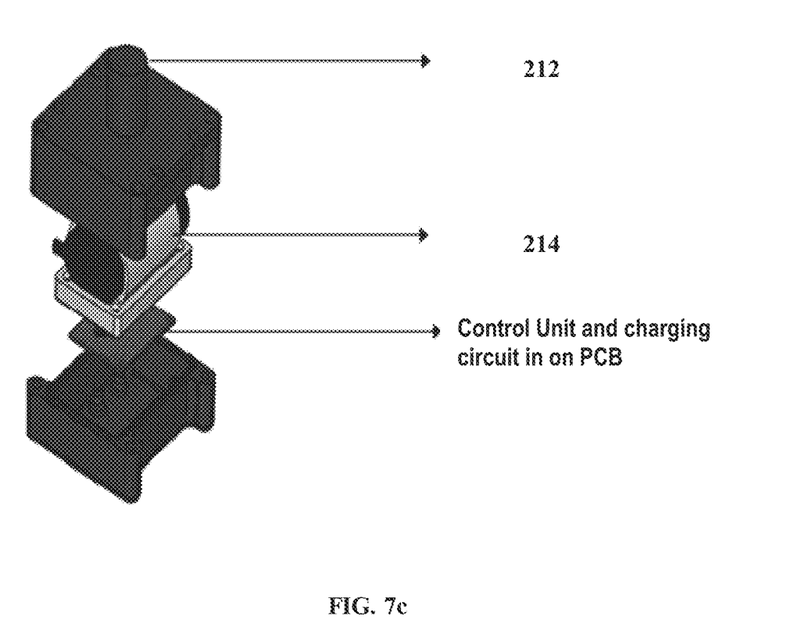

FIGS. 7a-7c depict different packing/design implementation of the battery management unit 210 including the sensor 212, the secondary battery 214, and the charger circuitry 216 in the control system 201 of the agricultural implement 200, according to embodiments as disclosed herein.

As depicted in FIG. 7a, the bottom cover 506 may be designed to hold both the sensor 212, and the charger circuitry 216 as a single unit. The charger circuitry 216 may have electrical connection to the secondary battery 214 for the charging of the secondary battery 214. The partition unit 502 may be designed to hold the control unit 208 and the secondary battery 214 together. The top cover 504 may have provision for holding the control unit 208. In an embodiment, if any problem occurs in the sensor 212, or the control unit 208, then only individual unit can be replaced.

As depicted in FIG. 7b, the bottom cover 506 may be designed to hold the sensor 212, and the charger circuitry 216 as separate units. In an embodiment, if any problem occurs in the sensor 212, or the charger circuit 216, or the control unit 208, then only individual unit can be replaced.

As depicted in FIG. 7c, the bottom cover 506 may be designed to hold only the sensor 212. The top cover 504 may be designed to hold a single printed circuit board (PCB) including the control unit 208, and the charger circuitry 216. The partition cover 502 may be designed to hold both the secondary battery 214, and the single PCB including the control unit 208, and the charger circuitry 216.

Figure 8:
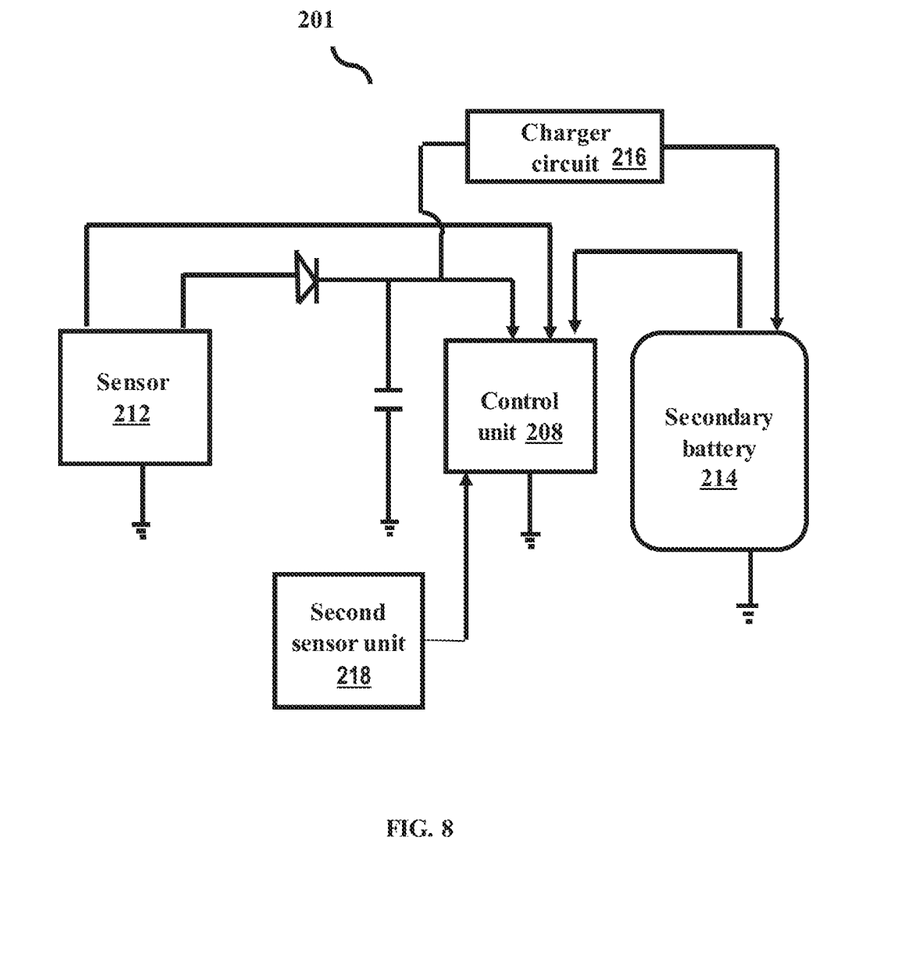
FIG. 8 depicts the control system of the agricultural implement including the sensor, the secondary battery, the charging circuitry, and the secondary sensor unit, according to embodiments as disclosed herein.

FIG. 8 depicts the control system 201 of the agricultural implement 200 including the sensor 212, the secondary battery 214, the charging circuitry 216, and the secondary sensor unit 218, according to embodiments as disclosed herein. As depicted in FIG. 8, the control system 201 includes the sensor 212, the secondary battery 214, the charger circuitry 216, the secondary sensor unit 218, and the control unit 208. The sensor 212, the secondary battery 214, the charger circuitry 216, and the secondary sensor unit 218 can be connected to the control unit 208.

In an embodiment, the sensor 212 can be used as dedicated power source. The sensor 212 can be configured to generate only the power supply/voltage on measuring the rotation of the agricultural implement 200 (as depicted in FIG. 3b). The generated power supply can be provided to the control unit 208. The secondary battery 214 can be configured to provide the power supply to the control unit 208, when the agricultural implement 200 operates at the lower RPMs. The charger circuit 216 can be configured to charge the secondary battery 214.

In an embodiment, the separate secondary sensor unit 218 can be configured to measure the speed of the agricultural implement 200. The secondary sensor unit 218 may include at least one speed sensor for measuring the speed of the agricultural implement 200. The speed can be measured with respect to the rotation of the agricultural implement 200. The secondary sensor unit 218 can be mounted on the agricultural implement 200 at suitable position. In an embodiment, the secondary sensor unit 218 can be an hour counter. In an embodiment, the secondary sensor unit 218 can be, but not limited to, a magnetic type speed sensor, a proximity type speed sensor, a contact-type sensor, a non-contact type sensor and so on. In an embodiment, the secondary sensor unit 218 can be a Hall Effect sensor. However, it is also within the scope of the embodiments disclosed herein to provide any type of speed sensor without otherwise deterring the intended function of measuring speed values as can be deduced from this description and corresponding drawings.

Figure 9:
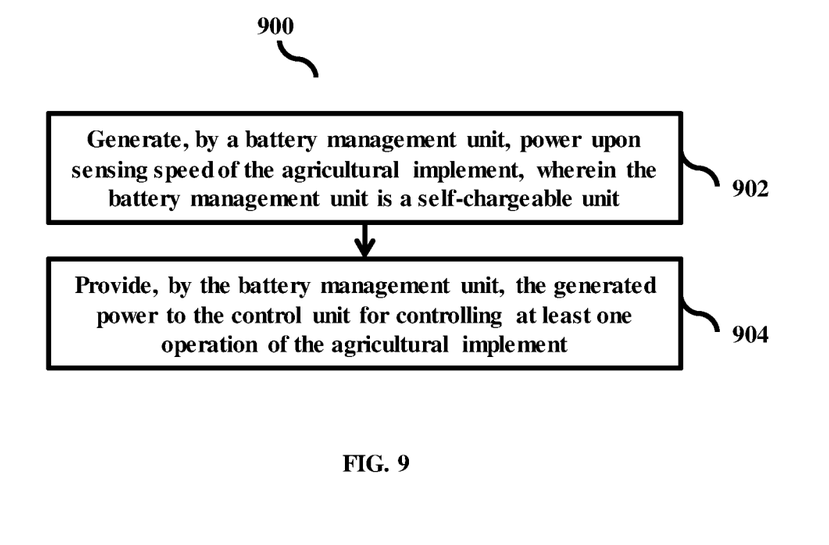
FIG. 9 is a flow diagram depicting a method for performing self-charging in the agricultural implement, according to embodiments as disclosed herein.

FIG. 9 is a flow diagram 900 depicting a method for performing self-charging in the agricultural implement, according to embodiments as disclosed herein. At step 902, the method includes generating, by the battery management unit 210, the power on sensing speed of the agricultural implement 200, wherein the battery management unit 210 is a self-rechargeable unit. In an embodiment, the battery management unit 210 includes the sensor 212. In an embodiment, the battery management unit 210 includes the sensor 212, and the secondary battery 214. In an embodiment, the battery management unit 210 includes the sensor 212, the secondary battery 214, and the charger circuitry 216.

At step 904, the method includes providing, by the battery management unit 210, the generated power to the control unit 208 for controlling at least one operation of the agricultural implement 200. The various actions in method 900 may be performed in the order presented, in a different order or simultaneously. Further, in some embodiments, some actions listed in FIG. 9 may be omitted.

Embodiments herein disclose a control system for an agricultural implement, wherein the control system includes a triggering unit a transmitter unit, and a battery unit/battery management unit. The control system is configured to self charge the battery unit. The triggering unit may reside in the transmitter unit. The electric charge may be provided in plurality of ways, which in turn provide the charge required for the sensor functioning. In addition, the self charging mechanism may be used for charging a small internal battery to avoid the fluctuations in the power from the main battery.

Embodiments herein may have a preliminary variable reluctance sensor design. Embodiments herein may disclose voltage induced in the coil as per faraday's law, V=-N dØ/dt (V), where: Ø=B*A (Tm2). In an embodiment, considering magnetic field strength of ferrite, B=0.5 T and dimensions of the cylindrical magnet with diameter=0.8 cm; height=1.5 cm, then area of magnet may be 0.0478 m, Ø=0.0478*0.5=0.0239 Tm2. In an embodiment, number of turns of the coil may be 100 and flux change rate as 0.1 sec considering lower speed.

The embodiments disclosed herein can be implemented through at least one software program running on at least one hardware device and performing network management functions to control the network elements. The elements shown in FIGS. 2a-8 include blocks, which can be at least one of a hardware device, or a combination of hardware device and software module.

The embodiments disclosed herein describe methods and systems for integrated sensing and self-charging in agricultural implement(s) connected to an agricultural vehicle. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

We claim:

1. A control system for an agricultural implement, the control system comprising:
   a control unit;
   a battery management unit coupled to the control unit, the battery management unit comprises at least one sensor configured to:
   generate a power based on a speed of the agricultural implement; and
   provide the generated power to the control unit as a primary power supply, wherein the battery management unit is a self-rechargeable unit;
   at least one secondary battery configured to provide the power to the control unit as an additional power supply when the agricultural implement operates at low Rotations Per Minute (RPM);
   a charger circuitry coupled to the at least one secondary battery configured to charge the at least one secondary battery;
   a partition cover configured to hold the at least one secondary battery, and the control unit;
   a top cover configured to hold the control unit, wherein the partition cover is connected to the top cover; and a bottom cover configured to hold the at least one sensor, wherein the at least one secondary battery is replaced by removing the top cover and without disturbing the control unit.

2. The control system as claimed in claim 1, wherein the at least one sensor includes a magneto system positioned in proximity with a rotor of the agricultural implement.

3. The control system as claimed in claim 2, wherein the magneto system interacts with the rotor when the rotor starts rotating that changes a magnetic field, wherein the change in magnetic field induces the power on the magneto system of the at least one sensor.

4. The control system as claimed in claim 1, wherein the at least one sensor includes at least one of a magnetic to inductance sensor, and a non-contact to contact type sensor for generating the power.

5. The control system as claimed in claim 1,
wherein the partition cover is configured to hold the at least one secondary battery, and the control unit;
wherein the top cover is configured to hold the control unit;
wherein the bottom cover is configured to hold the at least one sensor and the charger circuitry as a single unit; and
wherein the charger circuitry includes an electrical connection to the at least one secondary battery.

6. The control system as claimed in claim 1, wherein the bottom cover is configured to hold the at least one sensor and the charger circuitry as separate units.

7. The control system as claimed in claim 1, wherein the top cover is configured to hold the control unit and the charger circuitry on a single physical circuit board.

8. The control system as claimed in claim 1, wherein the control system comprises:
a secondary sensor unit coupled to the battery management unit, and the control unit configured to sense at least one parameter of the agricultural implement, wherein the battery management unit includes the at least one sensor, the at least one secondary battery, and the charger circuitry, wherein the at least one parameter includes at least one of load, hours of usage, and time of operation.

9. The control system as claimed in claim 1, wherein the control unit is configured to provide at least one alert to an operator to change oil by monitoring oil change alerts at a periodic interval of time.

10. A method for self-charging in an agricultural implement, the method comprising:
generating, by at least one sensor of a battery management unit, a power based on a speed of the agricultural implement, wherein the battery management unit is a self-rechargeable unit;
providing, by the at least one sensor, the generated power to a control unit as a primary power supply for controlling at least one operation of the agricultural implement;
providing, by at least one secondary battery, the power to the control unit as an additional power supply when the agricultural implement operates at low Rotations Per Minute (RPM);
charging, by a charger circuitry, the at least one secondary battery;
holding, by a partition cover, the at least one secondary battery, and the control unit;
holding, by a top cover, the control unit, wherein the partition cover is connected to the top cover; and
holding, by a bottom cover, the at least one sensor, wherein the at least one secondary battery is replaced by removing the top cover and without disturbing the control unit.

11. The method as claimed in claim 10, wherein the at least one sensor includes a magneto system positioned in proximity with a rotor of the agricultural implement.

12. The method as claimed in claim 11, wherein the magneto system interacts with the rotor when the rotor starts rotating that changes a magnetic field, wherein the change in magnetic field induces the power on the magneto system of the at least one sensor.

13. The method as claimed in claim 10, the method comprising:
holding, by the partition cover, the at least one secondary battery, and the control unit;
holding, by the top cover, the control unit; and
holding, by the bottom cover, the at least one sensor and the charger circuitry as a single unit, wherein the charger circuitry includes electrical connection to the at least one secondary battery.

14. The method as claimed in claim 13, the method comprising holding, by the bottom cover, the at least one sensor and the charger circuitry as separate units.

15. The method as claimed in claim 13, the method comprising holding, by the top cover, the control unit and the charger circuitry on a single physical circuit board.

16. The method as claimed in claim 10, the method comprising:
sensing, by a secondary sensor unit, at least one parameter of the agricultural implement, wherein the at least one parameter includes at least one of load, hours of usage, and time of operation.

17. The method as claimed in claim 10, the method comprising providing, by the control unit, at least one alert to an operator to change oil by monitoring oil change alerts at a periodic interval of time.

* * * * *